(12) United States Patent
Ichikawa et al.

(10) Patent No.: US 10,812,665 B2
(45) Date of Patent: Oct. 20, 2020

(54) INFORMATION TRANSMITTING APPARATUS, MULTIFUNCTIONAL PERIPHERAL, INFORMATION TRANSMITTING METHOD, AND NON-TRANSITORY RECORDING MEDIUM

(71) Applicant: Sharp Kabushiki Kaisha, Sakai, Osaka (JP)

(72) Inventors: Masashi Ichikawa, Sakai (JP); Yuichi Nishii, Sakai (JP); Miyoko Maruyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/111,269

(22) Filed: Aug. 24, 2018

(65) Prior Publication Data

US 2019/0068803 A1 Feb. 28, 2019

(30) Foreign Application Priority Data

Aug. 28, 2017 (JP) .................................. 2017-162941

(51) Int. Cl.
*H04N 1/00* (2006.01)
*G06F 21/31* (2013.01)

(52) U.S. Cl.
CPC ......... *H04N 1/00209* (2013.01); *G06F 21/31* (2013.01); *H04N 2201/0094* (2013.01); *H04N 2201/3208* (2013.01); *H04N 2201/3278* (2013.01)

(58) Field of Classification Search
None
See application file for complete search history.

(56) References Cited

U.S. PATENT DOCUMENTS

| | | | | |
|---|---|---|---|---|
| 2006/0050303 | A1* | 3/2006 | Oomori | H04N 1/32037 358/1.15 |
| 2008/0086646 | A1* | 4/2008 | Pizano | H04L 9/3231 713/189 |
| 2009/0060392 | A1* | 3/2009 | Nogawa | H04N 1/00204 382/305 |
| 2009/0135446 | A1* | 5/2009 | Kawabuchi | H04N 1/00222 358/1.15 |
| 2015/0046975 | A1* | 2/2015 | Kato | H04L 63/08 726/3 |
| 2016/0078509 | A1* | 3/2016 | Yamano | G06Q 30/0283 705/26.35 |
| 2017/0359336 | A1* | 12/2017 | Votaw | H04L 63/0838 |

FOREIGN PATENT DOCUMENTS

JP 2006-101484 A 4/2006

\* cited by examiner

*Primary Examiner* — Frantz Bataille
(74) *Attorney, Agent, or Firm* — Keating & Bennett, LLP

(57) ABSTRACT

An information transmitting apparatus includes a search unit and an information transmitting unit. The search unit searches for at least one destination linked with authentication information using a character string corresponding to the authentication information as a keyword. The information transmitting unit transmits information using a search result obtained by the search unit.

18 Claims, 10 Drawing Sheets

FIG. 5A

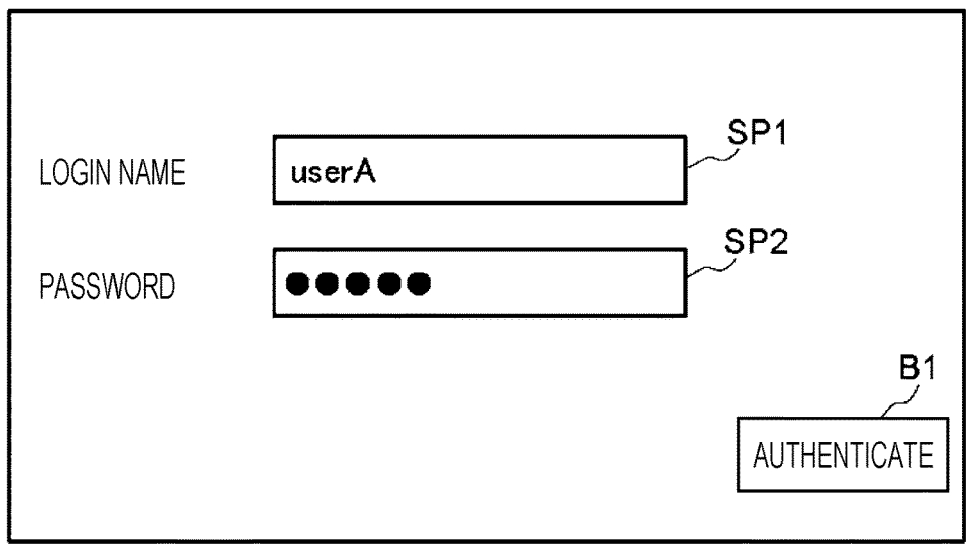

FIG. 5B

| LOGIN NAME | PASSWORD | USER NAME | DESTINATION |
|---|---|---|---|
| userA | ●●●●● | Suzuki | suzuki@example.com |
| userA_home | ●●●●● | Suzuki_home | suzuki@home100.com |
| userA_emergency | ●●●●● | Suzuki_emergency | suzuki@ocean100.com |
| userA_additional | ●●●●● | Tarou | suzuki@mountain300.com |
| user_office | ●●●●● | Suzuki_office2 | suzuki@lake400.com |
| userB | ●●●●● | Tanaka | tanaka@example.com |
| userB_home | ●●●●● | Tanaka_home | tanaka@home100.com |
| userB_emergency | ●●●●● | Tanaka_emergency | tanaka@ocean100.com |
| ⋮ | ⋮ | ⋮ | ⋮ |
| userZ | ●●●●● | Takahashi | takahashi@example.com |

FIG. 5C

| LOGIN NAME | PASSWORD | USER NAME | DESTINATION |
|---|---|---|---|
| userA | ●●●●● | Suzuki | suzuki@example.com |
| userA_home | ●●●●● | Suzuki_home | suzuki@home100.com |
| userA_emergency | ●●●●● | Suzuki_emergency | suzuki@ocean100.com |
| userA_additional | ●●●●● | Tarou | suzuki@mountain300.com |

FIG. 8A

| DESTINATION | | 🔍 | OK |

COMPANY c1
info@companyc1.com

COMPANY c2
mail@companyc2.com

COMPANY c3
office@companyc3.com

DESTINATION Suzuk_    🔍  OK — B6

| 1 | 2 | 3 | 4 | 5 | 6 | 7 | 8 | 9 | 0 |
| a | b | c | d | e | f | g | @ |
| h | i | j | k | l | m | n | . |
| o | p | q | r | s | t | u | - |
| v | w | x | y | z | SWITCH TO UPPERCASE | key

FIG. 8C

🔍  userA                    RE-SEARCH   OK
       SP3                      B7        B6

C — ✓ ✉ userA                         P
     ✉ userA_home
     ✉ userA_emergency
     ✉ userA_additional

PLEASE SELECT TRANSMISSION DESTINATION.

L1

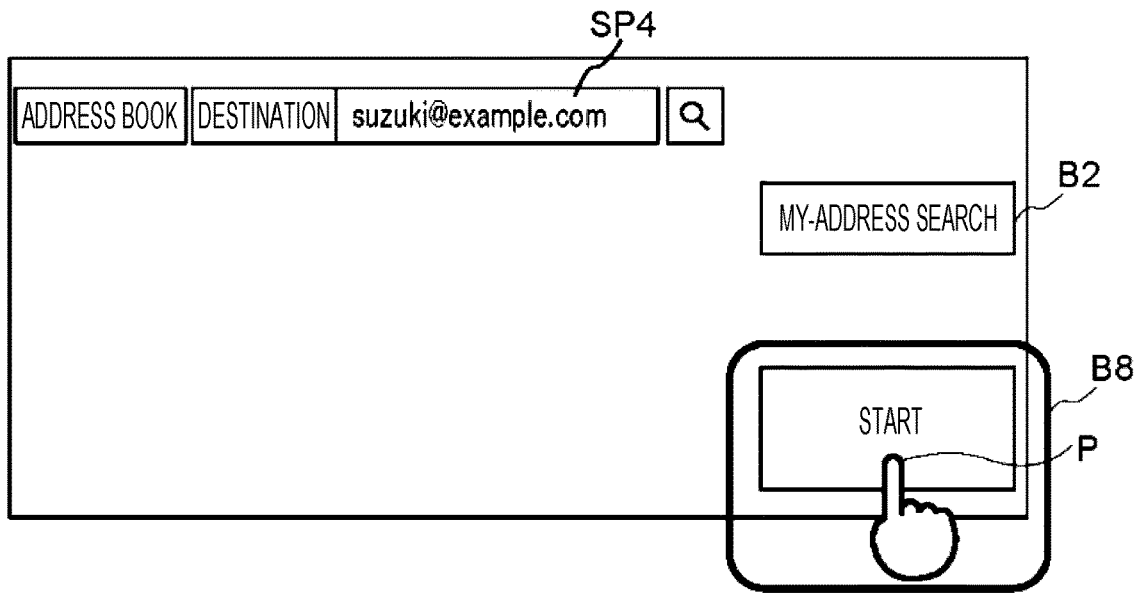

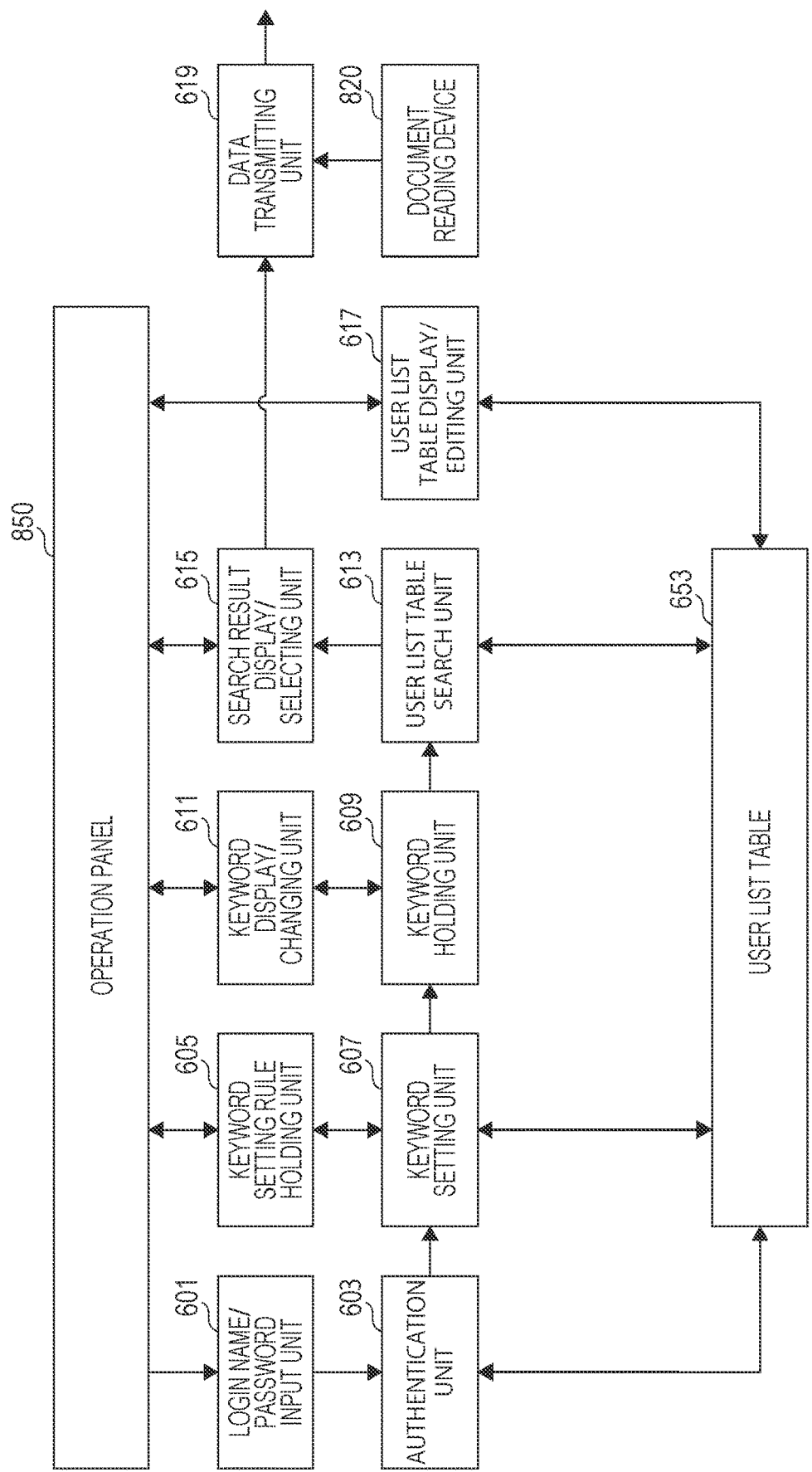

INFORMATION TRANSMITTING APPARATUS, MULTIFUNCTIONAL PERIPHERAL, INFORMATION TRANSMITTING METHOD, AND NON-TRANSITORY RECORDING MEDIUM

BACKGROUND

1. Field

The present disclosure relates to an information transmitting apparatus, a multifunctional peripheral (MFP), an information transmitting method, and a non-transitory recording medium for selecting a destination linked with an authenticated user.

2. Description of the Related Art

It is widely known as an authentication method for MFPs to determine whether or not an input user ID and password match a pre-registered user ID and password. An authentication-completed user can execute various jobs on an MFP, such as copying, printing, facsimile transmission, acquisition of facsimile reception information, and document reading with the use of a scanner function.

Among these various jobs, in the case of, for example, document reading with the use of a scanner, the read data is generally transmitted to a personal computer or the like via a network. To perform this transmission, an e-mail address is used.

Japanese Unexamined Patent Application Publication No. 2006-101484 (published on Apr. 13, 2006) discloses that an authentication-completed user selects a desired destination from among destinations registered in an address book stored in an MFP, and transmits information to the selected destination.

In addition, it is also disclosed that, by specifying an authentication-completed user's e-mail address linked with authentication information, the read data is transmitted to the user's personal computer via a mail server.

In recent years, there has been an increasing number of cases in which one user has multiple e-mail addresses and use these e-mail addresses properly according to the usage. For example, a certain e-mail address is used for general purposes, another e-mail address is used for emergency, and yet another e-mail address is shared with other family members.

The method disclosed in Japanese Unexamined Patent Application Publication No. 2006-101484 is that, because each user's e-mail address serving as a destination is limited to one address, the method is unable to cope with the case where each user has multiple e-mail addresses and use these e-mail addresses properly according to the usage.

To deal with this problem, the following method is conceivable. A user registers many email addresses in the user's address book, and selects one e-mail address from among the registered e-mail addresses according to purpose. However, because many other e-mail addresses besides the user's email addresses are registered in the address book, it takes much effort and is inefficient to find a desired address or to search for a desired address by inputting part of the address or all of the characters and numerals of the address.

Furthermore, another method is conceivable to deal with this problem. In this method, items of user information for authentication, the number of which is the number of e-mail addresses to use, are registered. However, because it involves authentication using a corresponding login name and password according to an e-mail address to use, each user needs to memorize all of login names and passwords and e-mail addresses linked with these login names and passwords.

SUMMARY

It is desirable to provide an information transmitting apparatus, an MFP, an information transmitting method, and a non-transitory recording medium for easily specifying a desired destination from among an authenticated user's or authenticated-user-related multiple destinations linked with the authenticated user.

According to an aspect of the disclosure, there is provided an information transmitting apparatus including a search unit and an information transmitting unit. The search unit searches for at least one destination linked with authentication information using a character string corresponding to the authentication information as a keyword. The information transmitting unit transmits information using a search result obtained by the search unit.

According to another aspect of the disclosure, there is provided an information transmitting method including: searching for at least one destination linked with authentication information using a character string corresponding to the authentication information as a keyword; and transmitting information using a search result obtained in the searching.

According to another aspect of the disclosure, there is provided a multifunctional peripheral including the above-described information transmitting apparatus.

According to another aspect of the disclosure, there is provided a non-transitory recording medium storing a program for causing a computer to function as the above-described information transmitting apparatus.

BRIEF DESCRIPTION OF THE DRAWINGS

FIG. 5A is a diagram illustrating a login screen of the MFP according to the first embodiment;

FIG. 5B is a diagram illustrating an example of a user list in the first embodiment;

FIG. 5C is a diagram illustrating the search results in the case where a my-address search is conducted on the user list table illustrated in FIG. 5B using a login name as a keyword;

FIG. 8A is a diagram illustrating a screen for conducting a my-address search according to the first embodiment;

FIG. 8B is a diagram illustrating a direct input screen according to the first embodiment;

FIG. 8C is a diagram illustrating a screen for conducting a my-address search according to the first embodiment;

FIG. 9 is an explanatory diagram illustrating specification of an e-mail address on the display unit of the MFP according to the first embodiment;

FIGS. 10A and 10B are explanatory diagrams illustrating an example of login display and a user list of the MFP according to a third embodiment; and FIG. 11 is a functional block diagram of a my-address search apparatus and its peripherals according to a fourteenth embodiment.

DESCRIPTION OF THE EMBODIMENTS

Hereinafter, embodiments of the present disclosure will be described in detail with reference to the drawings.

First Embodiment

Figure 1:
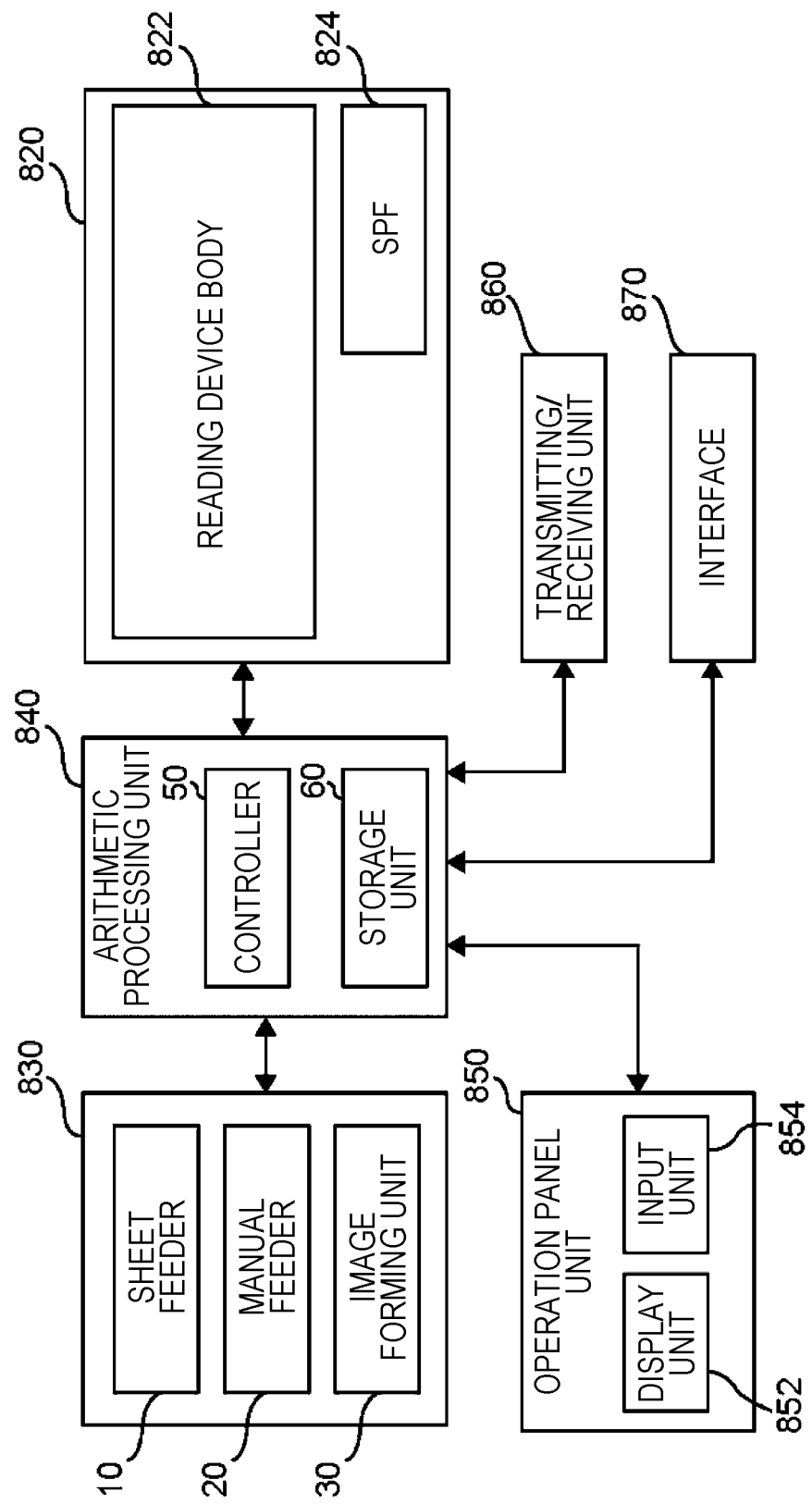
FIG. 1 is a functional block diagram of an MFP according to a first embodiment.
Figure 2:
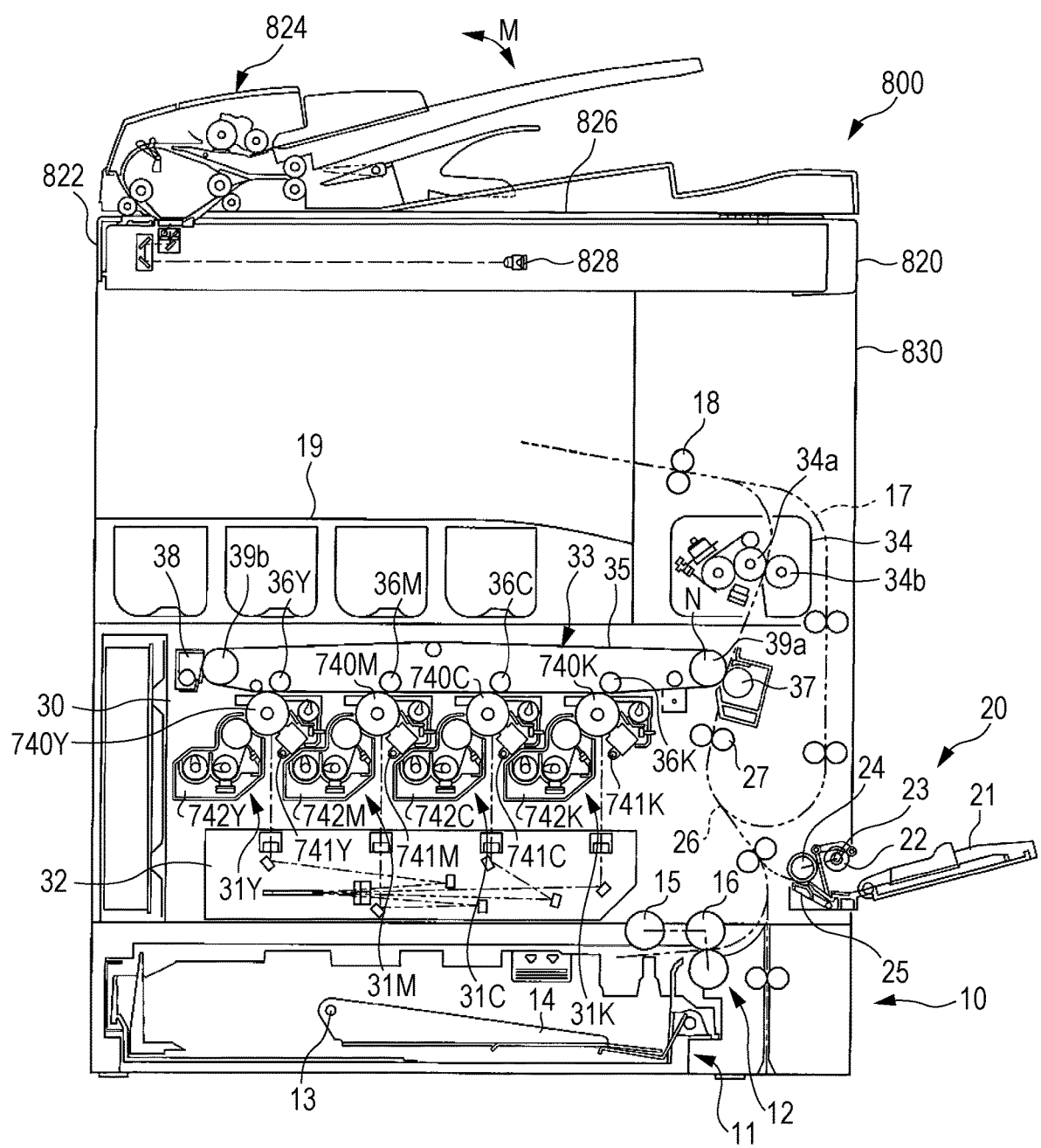
FIG. 2 is a conceptual cross-sectional view of the MFP according to the first embodiment.

A first embodiment relates to an MFP 800 including an information transmitting apparatus according to second to seventeenth embodiments. FIGS. 1 and 2 illustrate the configuration of the MFP 800.

As illustrated in FIGS. 1 and 2, the MFP 800 includes the following: a document reading device 820, which reads an image of a document; an MFP body (image forming unit body) 830, which forms an image on a sheet; an operation panel unit 850, which is for operating the document reading device 820 and the MFP body 830; an arithmetic processing unit 840, which controls the document reading device 820 and the MFP body 830 on the basis of an operation performed with the operation panel unit 850; a transmitting/receiving unit 860, which transmits/receives image information via various public lines; and an interface 870, which is for establishing wired or wireless connection with a server.

The operation panel unit 850 is a touchscreen display including a display unit 852 and an input unit 854, and various types of information and buttons are displayed in accordance with the mode of the MFP 800.

The transmitting/receiving unit 860 can transmit an image read by the document reading device 820 or an image stored in a storage device, and receive an image from the outside.

The document reading device 820 includes a single pass feeder (SPF) 824, which automatically feeds a document, and a reading device body 822, which reads an image of a document. Note that the document reading device 820 includes, besides the elements illustrated in FIG. 2, elements that are not illustrated in FIG. 2 but are illustrated in FIG. 1. In addition, as illustrated in FIGS. 1 and 2, the reading device body 822 includes a document table 826.

The MFP body 830 includes the following: a sheet feeder 10, which feeds sheets; a manual feeder 20, which can manually feed sheets; and an image forming unit 30, which forms an image on a sheet fed by the sheet feeder 10 or the manual feeder 20.

The sheet feeder 10 includes a sheet loading section 11, which loads sheets, and a separate feeding section 12, which separately feeds sheets loaded on the sheet loading section 11, one sheet at a time. The sheet loading section 11 includes an intermediate plate 14, which rotates around a rotation shaft 13. The intermediate plate 14 rotates when feeding a sheet, and lifts the sheet upward. The separate feeding section 12 includes a pickup roller 15, which feeds a sheet lifted by the intermediate plate 14, and a separation roller pair 16, which separates sheets fed by the pickup roller 15, one sheet at a time.

The manual feeder 20 includes a manual feed tray 21, which can load sheets, and a separate feeding section 22, which separately feeds sheets loaded on the manual feed tray 21, one sheet at a time. The manual feed tray 21 is rotatably supported by the MFP body 830. When manually feeding sheets, the manual feed tray 21 is fixed at a certain angle to load sheets. The separate feeding section 22 includes a pickup roller 23, which feeds sheets loaded on the manual feed tray 21, and a separation roller 24 and a separation pad 25, which separate sheets fed by the pickup roller 23, one sheet at a time.

The image forming unit 30 includes the following: four process cartridges 31Y, 31M, 31C, and 31K, which form yellow (Y), magenta (M), cyan (C), and black (K) images, respectively; photosensitive drums 740Y to 740K, which will be described later; an exposure device 32, which exposes the surface of the photosensitive drums 740Y to 740K; a transfer unit 33, which transfers toner images formed on the surface of the photosensitive drums 740Y to 740K to a sheet; and a fusing unit 34, which fuses the transferred toner images on the sheet. Note that the letters of the alphabet (Y, M, C, and K) added at the end of symbols indicate corresponding colors (yellow, magenta, cyan, and black).

Each of the four process cartridges 31Y to 31K is configured to be removable from the MFP body 830 and is replaceable. Because the four process cartridges 31Y to 31K have the same configuration except for the point that the color of an image to be formed is different, only the configuration of the process cartridge 31Y, which forms a yellow (Y) image, will be described, and descriptions of the process cartridges 31M to 31K will be omitted.

The process cartridge 31Y includes the following: the photosensitive drum 740Y, which serves as an image carrier; a charger 741Y, which charges the photosensitive drum 740Y; a developing device 742Y, which develops an electrostatic latent image formed on the photosensitive drum 740Y; and a drum cleaner that removes toner left on the surface of the photosensitive drum 740Y. The developing device 742Y includes a developing device body (details are not illustrated) for developing an electrostatic latent image formed on the photosensitive drum 740Y, and a toner cartridge (details are not illustrated) for supplying toner to the developing device body. The toner cartridge is configured to be attachable to and detachable from the developing device body. When the contained toner is exhausted, the toner cartridge can be removed from the developing device body and replaced.

The exposure device 32 includes a light source (not illustrated) that emits laser light, and a plurality of mirrors (not illustrated) for guiding the laser light to the photosensitive drums 740Y to 740K. The transfer unit 33 includes the following: an intermediate transfer belt 35, which carries toner images formed on the photosensitive drums 740Y to 740K; primary transfer rollers 36Y to 36K, which primarily transfer the toner images formed on the photosensitive drums 740Y to 740K to the intermediate transfer belt 35; a secondary transfer roller 37, which secondarily transfers the toner image transferred to the intermediate transfer belt 35 to a sheet; and a belt cleaner 38, which removes toner left on the intermediate transfer belt 35. The intermediate transfer belt 35 is wound over a driving roller 39a and a driven roller 39b and is pressed against the photosensitive drums 740Y to 740K by the primary transfer rollers 36Y to 36K. The secondary transfer roller 37 nips the intermediate transfer belt 35 with the driving roller 39a, and transfers a toner image carried by the intermediate transfer belt 35 to a sheet at a nip portion N. The fusing unit 34 includes a heating roller 34*a*, which heats a sheet, and a pressure roller 34*b*, which pressure-welds the heating roller 34*a*.

The operation panel unit 850 includes the display unit 852, which displays certain information, and the input unit 854, which allows a user to input instructions to the document reading device 820 and the MFP body 830. In the present embodiment, the operation panel unit 850 is arranged on the front side of the reading device body 822. Note that the front side corresponds to the front side of the page of FIG. 2, and the back side corresponds to the back side of FIG. 2.

As illustrated in FIGS. 1 and 2, the arithmetic processing unit 840 includes the following: a controller 50, which drives and controls the sheet feeder 10, the manual feeder 20, the image forming unit 30, and the document reading device 820; and a storage unit 60, which stores various programs for operating the controller 50 and various types of information used by the controller 50. The storage unit 60 can store an image read by the document reading device 820 and an image received by the transmitting/receiving unit 860. On the basis of an operation performed by a user on the operation panel unit 850, the arithmetic processing unit 840 integrally controls the operation of the sheet feeder 10, the manual feeder 20, the image forming unit 30, and the document reading device 820 and causes an image to be formed on a sheet.

Next, an image forming operation performed by the MFP 800 with the above-described configuration (image formation control performed by the arithmetic processing unit 840) will be described. In the present embodiment, an image forming operation in which an image of a document fed by the SPF 824 and read by the reading device body 822 is formed by the image forming unit 30 on a sheet fed by the sheet feeder 10 will be described by way of example.

In response to transmission of an image formation start signal as a result of an input from a user to the input unit 854 of the operation panel unit 850, a to-be-read document placed by the user on the SPF 824 is automatically fed toward a document reading position, and an image of the document is read at the document reading position by the reading device body 822.

When an image of the document is read by the reading device body 822, the exposure device 32 emits, on the basis of image information of the read document, a plurality of laser light beams corresponding to the photosensitive drums 740Y to 740K toward the photosensitive drums 740Y to 740K, respectively. At this time, the photosensitive drums 740Y to 740K are charged in advance by the chargers 741Y to 741K, respectively, and irradiation with the corresponding laser light beams causes respective electrostatic latent images to be formed on the photosensitive drums 740Y to 740K. After that, the electrostatic latent images formed on the photosensitive drums 740Y to 740K are developed by the developing devices 742Y to 742K, and yellow (Y), magenta (M), cyan (C), and black (K) toner images are formed on the photosensitive drums 740Y to 740K, respectively. The toner images of these colors formed on the photosensitive drums 740Y to 740K are superposed and transferred by the primary transfer rollers 36Y to 36K to the intermediate transfer belt 35 to form a superposed and transferred toner image (full-color toner image), which in turn is carried by the intermediate transfer belt 35 and conveyed to the nip portion N.

In parallel with the above-described image forming operation, sheets loaded on the sheet loading section 11 are fed by the pickup roller 15 to a sheet conveying path 26 while being separated into one sheet by the separate feeding section 12. Skew of each sheet is corrected by a pair of resist rollers 27, which are provided upstream of the nip portion N in the sheet conveying direction, and each sheet is conveyed to the nip portion N at certain conveying timing. The secondary transfer roller 37 transfers the full-color toner image carried by the intermediate transfer belt 35 to the sheet conveyed to the nip portion N.

The sheet on which the toner image has been transferred is heated and pressed by the fusing unit 34 to cause the toner image to be fused, and is ejected to the outside of the apparatus by a pair of ejection rollers 18. The sheet ejected to the outside of the apparatus is loaded on an ejection sheet loading section 19.

In the case of forming images on both sides (a first side and a second side) of each sheet, before a sheet where an image has been formed on the first side is ejected to the outside of the apparatus, the pair of ejection rollers 18 is rotated backward to convey the sheet to a both-side conveying path 17, and the sheet is conveyed again to the image forming unit 30 via the both-side conveying path 17. Like the first side, an image is formed on the second side, and the sheet is ejected to the outside of the apparatus. The sheet ejected to the outside of the apparatus is loaded on the ejection sheet loading section 19.

Figure 3:
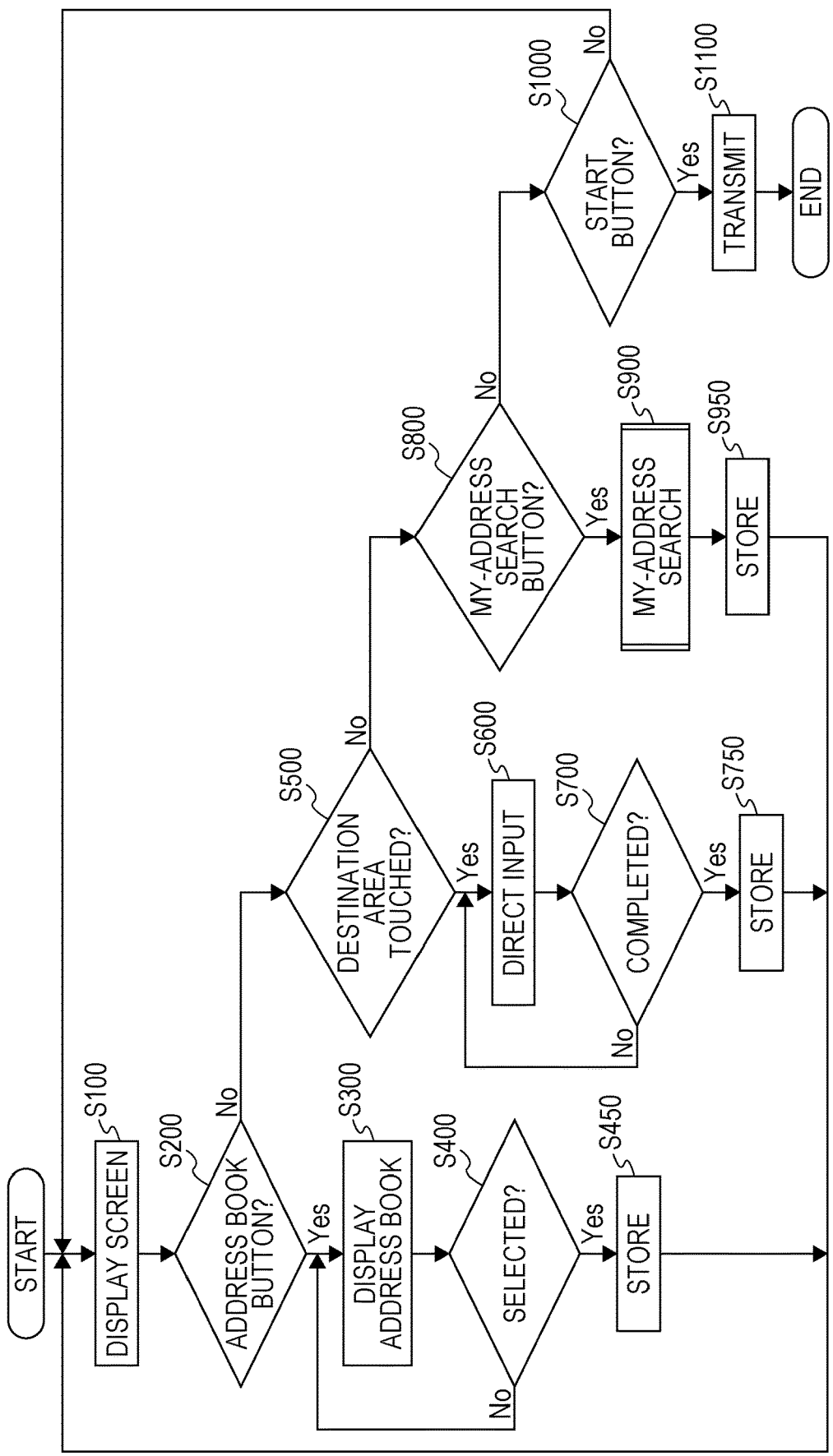
FIG. 3 is a flowchart illustrating the operation of the MFP according to the first embodiment.

Next, referring to FIG. 3, the operation of the MFP 800 according to the first embodiment will be described.

The user can select a desired job from a menu displayed on the display unit 852 of the operation panel unit 850 of the MFP 800, and cause the MFP 800 to execute that job. Here, authentication registration serving as a preparation for validating an authentication function is performed in response to inputting, by the user, a login name, a password, a user name, and an email address.

Authentication is performed when the user inputs, on an authentication screen illustrated in FIG. 5A, a login name in a text box SP1 via the input unit 854, a password in a text box SP2, and then presses an authentication button B1.

In addition, in this example, the MFP 800 performs a search of a user list table, whose contents are illustrated by way of example in FIG. 5B, using "userA", which is the login name, as a keyword. The user list table, which is the search destination in this case, is present in the MFP 800. In the case where the user list table illustrated in FIG. 5B is the search destination, "userA", "userA_home", "userA_emergency", and "userA_additional", which are login names including this login name, and user names and email addresses, serving as destinations, that correspond to these login names are obtained as the search results. The user can select one or more arbitrary email addresses from the search results as a transmission destination(s). Here, the user list table illustrated in FIG. 5B includes records each including a password, a user name, and a destination (email address) that are linked with a login name.

Hereinafter, referring to the flowchart illustrated in FIG. 3, the operation will be described.

Figure 7A:
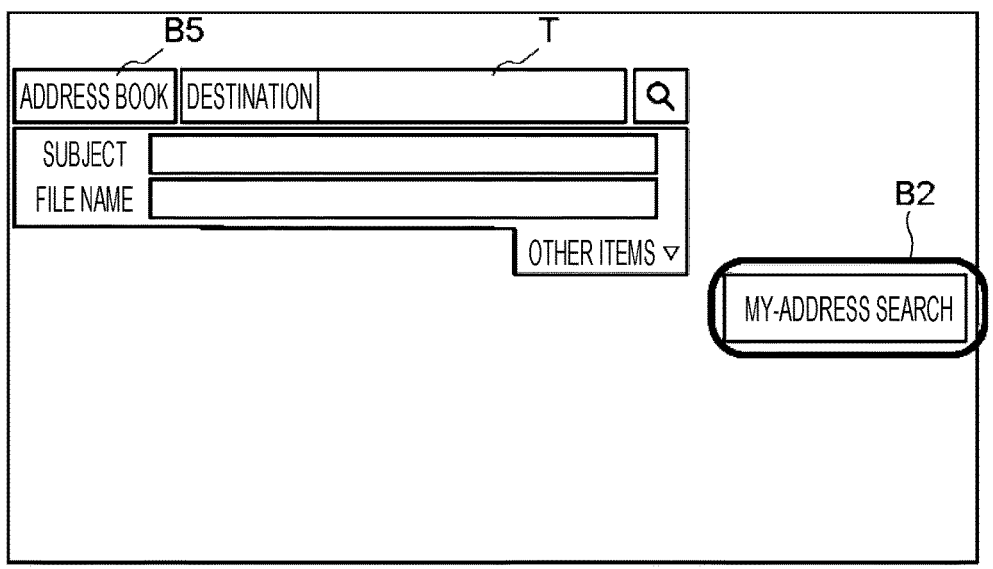
FIGS. 7A, 7B, and 7C are explanatory diagrams illustrating a my-address search button arranged on a scanner screen, an address book screen, and a home screen, respectively, which are displayed on the display unit of the MFP according to the first embodiment.

At first, a screen such as that illustrated in FIG. 7A is displayed (step S100). This screen is a screen for selecting any of display of an address book screen, direct input of a transmission destination, and execution of a my-address search.

Next, it is determined whether or not an address book button B5 illustrated in FIG. 7A has been pressed (step S200). When it is determined that the address book button B5 has been pressed, an address book screen illustrated by way of example in FIG. 8A is displayed (step S300).

The user can select a transmission destination from the address book. For example, the user can select "company c1, info@companyc1.com" as a transmission destination.

Next, it is determined whether or not the user has selected a desired transmission destination from the address book (step S400). When it is determined that the user has selected a desired transmission destination, the transmission destination is stored (step S450), and the screen is displayed again (step S100). Note that a plurality of transmission destinations can be selected from the address book, and OK is pressed to return to the original screen.

It is determined whether or not a destination area T has been pressed (step S500). When it is determined that the destination area T has been pressed, the screen changes to direct input of a destination using a keypad key (S600), as illustrated in FIG. 8B. Next, it is determined whether or not the destination input is completed by determining whether or not an "OK" button B6 has been pressed (step S700). When it is determined that the destination input is completed, the input transmission destination is stored (step S750), and the screen is displayed again (step S100).

It is determined whether or not a my-address search button B2 has been pressed (step S800). When it is determined that the my-address search button B2 has been pressed, a my-address search is executed (step S900). After execution of the my-address search, the address is stored (step S950). Details of a my-address search will be described later.

When at least one destination is set, a start button is validated, as illustrated in FIG. 9. On this screen, it is determined whether or not the start button has been pressed (step S1000). When it is determined that the start button has been pressed, transmission to all the destinations is performed (step S1100).

Therefore, specified destinations will be cumulatively stored as long as the start button is not pressed.

Figure 7B:
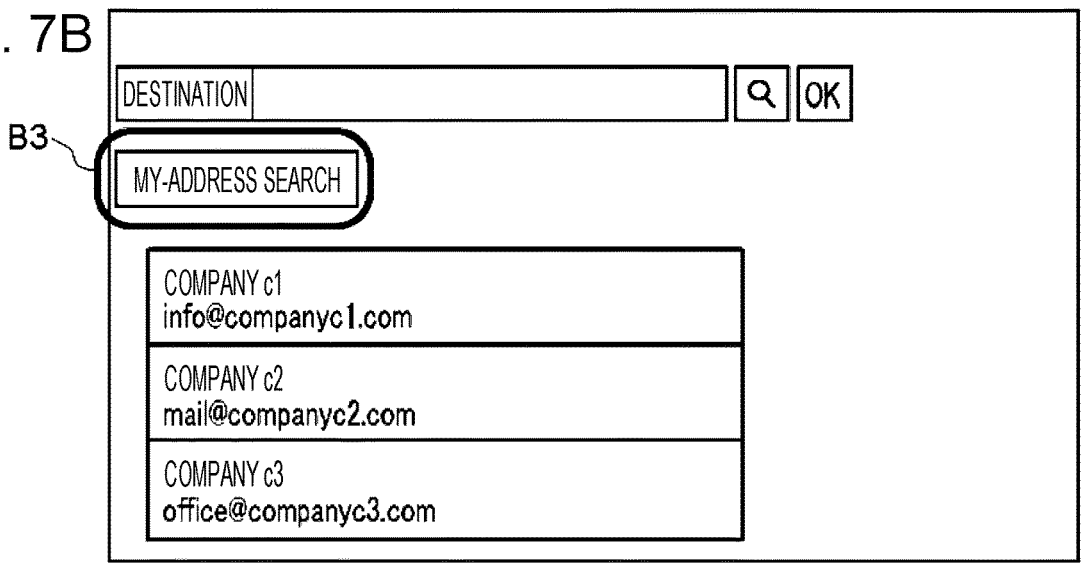
Figure 7C:
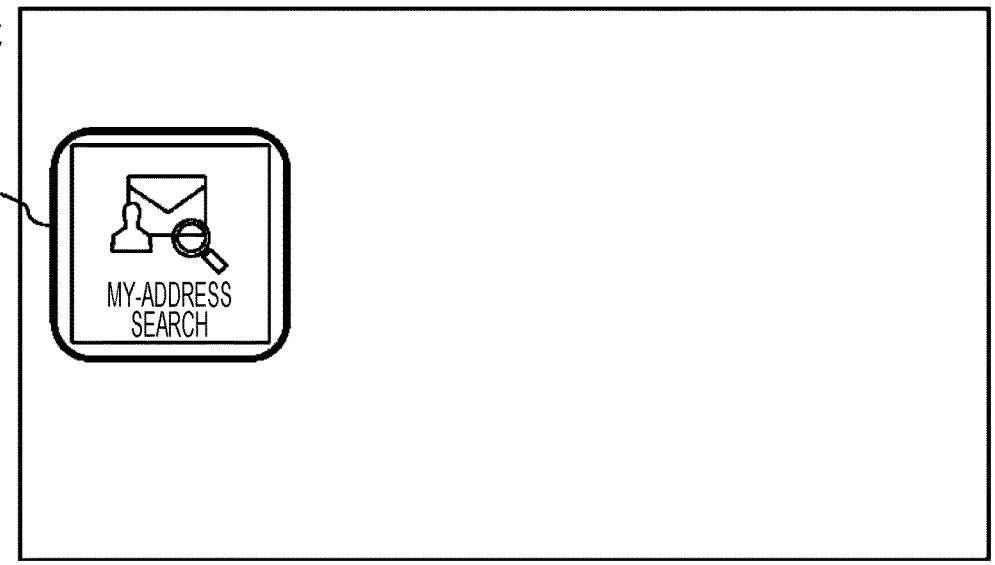

Note that the my-address search button is provided not only as the my-address search button B2 on the screen illustrated in FIG. 7A. The my-address search button may be added to an address book screen such as that illustrated in FIG. 8A, and may be as illustrated in FIG. 7B. Alternatively, the my-address search button may be provided also on a home screen displayed first when the user logs in, as illustrated in FIG. 7C. Accordingly, when the my-address search button is provided on the home screen, a my-address search can be conducted without going back and forth through several hierarchies.

Figure 4:
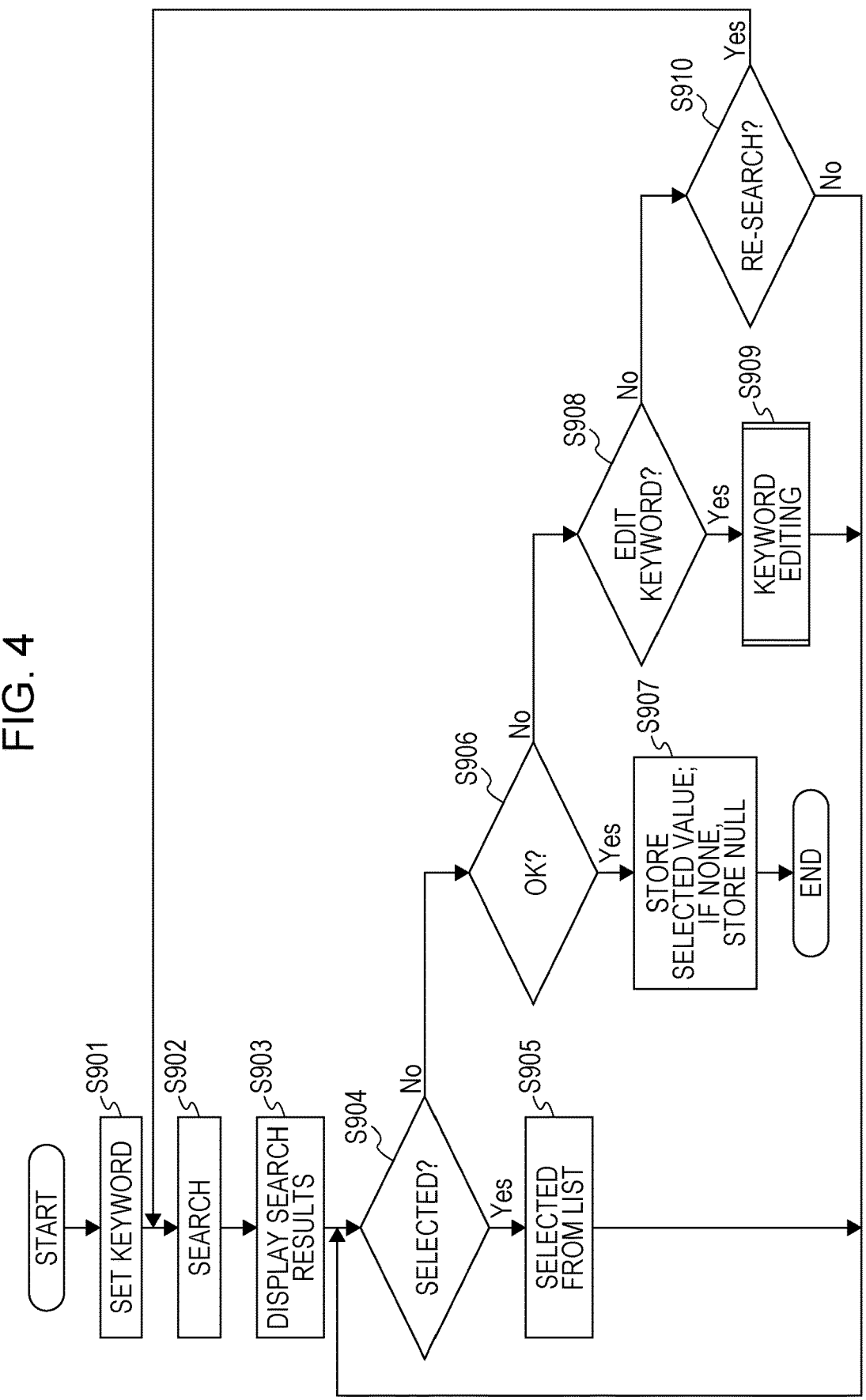
FIG. 4 is a flowchart illustrating the operation of the MFP according to the first embodiment.

Next, referring to FIG. 4, a my-address search (step S900) illustrated in FIG. 3 will be described.

Here, "my-address search" refers to, using the login name of an authenticated user and a user name associated with the login name as keywords, searching a user list table for the user's and user-related email addresses that are registered in association with the login name and the user name including the keywords. Retrieved login names are displayed as a list on the display unit 852 of the operation panel unit 850, as illustrated in FIG. 8C. An email address linked with a login name specified by the user from the displayed list serves as, for example, the destination of data read by the scanner.

In other words, by using the my-address search function, the authentication-completed user can select an address according to purpose from among a plurality of addresses according to purpose, such as the user's already registered email address and email address for emergency, and can transmit data read by the scanner to that address. In addition, a character string obtained by editing the login name or the user name can also be used as a keyword in a my-address search.

Next, the case in which a login name is used as a keyword in a my-address search will be described.

At first, a keyword is set (step S901). This means that the login name of a user who is currently logged in to the MFP 800 is used as a keyword. Next, a search is executed (step S902). With this search, all login names including the set keyword are retrieved. For example, in the case where the keyword is "userA", records whose login names include "userA" (namely, four records whose login names are "userA", "userA_home", "userA_emergency", and "userA_additional") are retrieved, as illustrated by way of example in FIG. 5C.

On a my-address search screen illustrated in FIG. 8C, these records are displayed as a list L1 illustrated in FIG. 8C along with the login name set as a keyword in a text box SP3 (step S903).

Here, a series of processes in steps S901 to S903 is automatically performed in response to pressing of the my-address search button B2.

FIG. 8C illustrates an example of the search results. In this example, in the case where the login name of a user who is currently logged in to the MFP 800 is "userA", as illustrated by way of example, "userA", "userA_home", "userA_emergency", and "userA_additional" including "userA" are displayed.

Next, when it is determined that any of the addresses has been selected by the user (YES in step S904), the destination selected from the list of the search results is written in a temporary storage unit (step S905). This selection is performed by pressing, by the user, the to-be-selected destination with a finger P on a touchscreen illustrated in FIG. 8C. In the example illustrated in FIG. 8C, "userA" is selected, and a check C is displayed. In the case of selecting from the address book, a plurality of destinations may be selected from the search results in the same way.

When it is determined that the "OK" button B6 has been pressed (YES in step S906), the destination selected in step S904 is stored; and, when there is no selected destination, NULL is stored (step S907). In the example illustrated in FIG. 8C, "userA, suzuki@example.com" is stored.

When it is determined that the text box SP3 has been pressed (YES in step S908), the process proceeds to a keyword editing routine (step S909).

When it is determined that a re-search button B7 has been pressed (YES in step S910), the process returns to step S902, and the processing from a re-search is re-executed.

Figure 6:
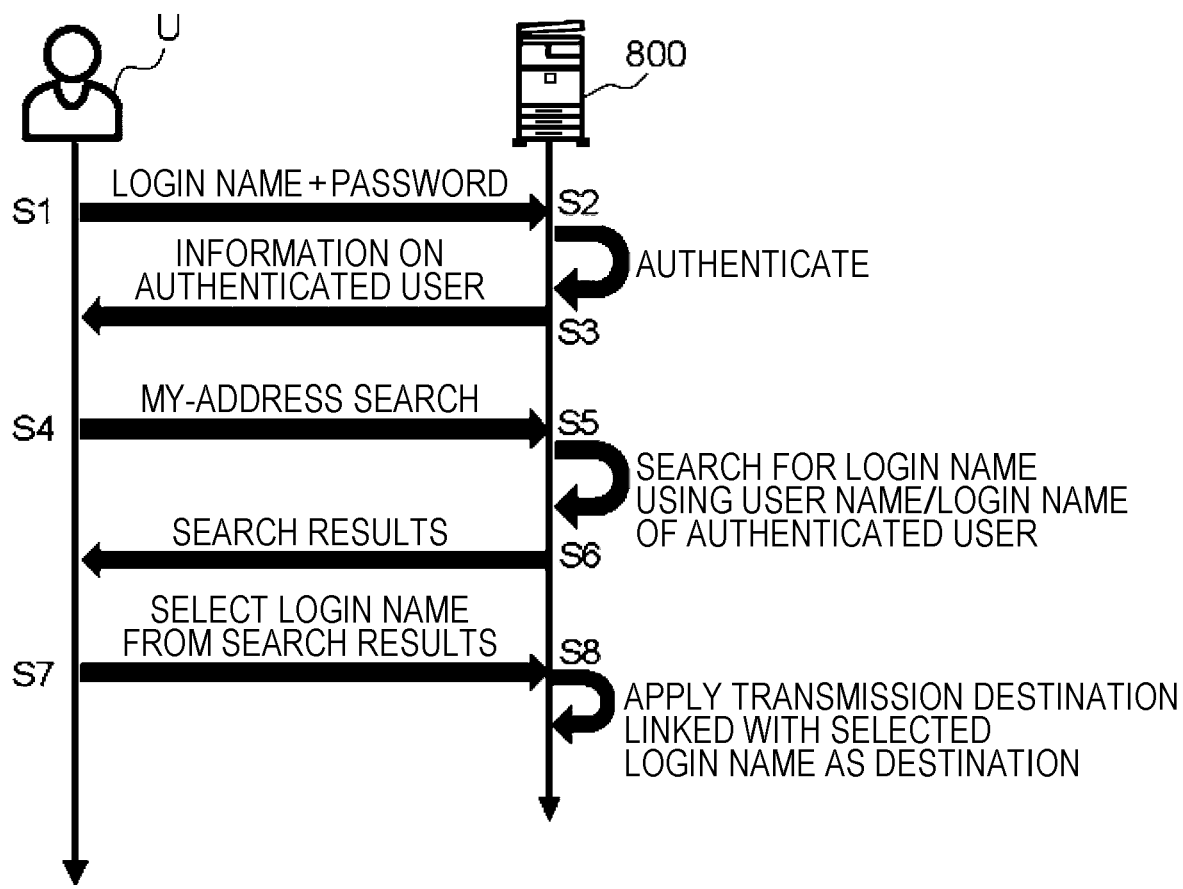
FIG. 6 is a processing flow illustrating the operation of the MFP according to the first embodiment.

Next, referring to FIG. 6, the processing flow of a my-address search (step S900) illustrated in FIG. 3 will be described.

A user U inputs his/her login name and password to the MFP 800 (step S1). The controller 50 performs authentication by verifying the input login name and password against registered login names and passwords (step S2), and displays information on the authenticated user on the display unit 852 of the operation panel unit 850 (step S3). As illustrated in FIG. 5A, an authentication screen displayed on the display unit 852 includes the text box SP1 for entering "login name", the text box SP2 for entering "password", and the authentication button B1 for requesting the MFP 800 to perform authentication.

Next, a request for a "my-address search" from the user U is accepted (step S4). A request for a "my-address search" is executed by pressing any of the my-address search buttons B2, B3, and B4, which are displayed on the scanner screen, the address book screen, and the home screen illustrated in FIGS. 7A, 7B, and 7C, respectively.

The controller 50 conducts a search using the login name of the authenticated user as a keyword (step S5). As illustrated in FIG. 8C, "userA" serving as the keyword is displayed in the text box SP3. The search results are displayed on the display unit 852 of the operation panel unit 850 (step S6). For example, when the input login name is "userA" as illustrated in FIG. 5A, all login names including "userA" are retrieved and displayed along with email addresses linked with all the retrieved login names, as illustrated in FIG. 8C.

In FIG. 8C, "userA", "userA_home", "userA_emergency", and "userA_additional" are the retrieved login names, and respective email addresses are linked with these login names and are displayed. The login name "userA" illustrated in FIG. 8C is editable by the user himself/herself. For example, when the login name "userA" is edited by attaching "Emergency" to become "userA_Emergency", the search results can be narrowed down from the beginning to those including "userA_Emergency" as the login name.

In addition, the email addresses are only for the convenience of description, and the actual e-mail addresses are various addresses to be specified by the user.

By pressing with the finger P any of the login names on the touchscreen displaying these login names, the user can select that login name linked with the email address of a destination to which the read data is to be transmitted (step S7). The login name selected by the user is checked and attached with the check C, thereby enabling the user to visually recognize the selected login name. As illustrated in FIG. 9, an email address linked with this login name is set as a destination (step S8). In a destination text box SP4 in FIG. 9, the email address "suzuki@example.com" linked with the login name "userA" selected in FIG. 8C is illustrated.

On this screen, when a start button B8 is pressed with the finger P, a job is executed by the controller 50, and, for example, the read data obtained by the scanner is transmitted via the interface 870 to the specified email address "suzuki@example.com".

With the above flow, an automatic search and narrowing-down using a login name as a keyword is performed just by pressing, by the user, the "my-address search" button, and the user can select a desired destination from the displayed results and perform transmission just by pressing the start button B8, which is very efficient.

In addition, because the "my-address search button" can be arranged as a short-cut key on the home screen, a my-address search can be instantaneously executed, thereby improving usability.

Although a user list table 653 is provided including records that may be returned as the search results by a my-address search, a table dedicated to my-address search may be set and records that may be returned as the search results by a my-address search may be provided in this table. In doing so, it becomes unnecessary to generate records dedicated to my-address search, which are not used for general login, in the user list table 653.

Second Embodiment

In response to pressing of the "my-address search button", the set search method (forward match, backward match, or partial match) may be executed using the login name as a keyword, and the search results may be immediately displayed on the my-address screen. At this time, it is preferable to display the login name in the text box SP3 on the my-address screen.

In response to pressing of the "my-address search button", the login name may be displayed in the text box SP3 on the my-address screen before executing a search, and a search may be executed if the search button is pressed afterwards. In doing so, the user can check the login name before conducting a search.

In any case, the search method may be re-set and a re-search may be conducted, a re-search may be conducted after editing the login name displayed as a keyword in the text box SP3 using a software keyboard or the like, or a re-search may be conducted after simultaneously resetting the search method and editing the login name.

For example, when there are many login names and when a particular character string is added according to each type, a re-search can be conducted after adding that character string by edition, which in turn narrows down the search results in advance.

Third Embodiment

In the first embodiment, the case has been described in which a search is conducted using a login name as a keyword, and transmission is performed to an email address linked with the login name. In addition, a user name linked with a login name may serve as a keyword, and furthermore, a combination of a login name and a user name may serve as keywords.

FIG. 10A illustrates the search results in the case where a user name serves as a keyword. In this case, a search is conducted using, for example, the user name "Suzuki" as a keyword. The results are displayed as the list L1 illustrated in FIG. 8C, and the user can select one of the results.

FIG. 10B illustrates the search results in the case where a login name and a user name serve as keywords. In this case, a search is conducted using, for example, the login name "userA" and the user name "Suzuki" as keywords. The results are displayed as the list L1 illustrated in FIG. 8C, and the user can select one of the results.

Fourth Embodiment

Although an email address serves as a destination in the above-described embodiments, a global Internet Protocol (IP) address or a private IP address may serve as a destination. In this case, data read by the scanner may be transmitted to each unit of hardware using the File Transfer Protocol (FTP) or the like.

Fifth Embodiment

In the above-described embodiments, the case has been described in which data read by the scanner is transmitted to a specified email address. Facsimile reception data received by the transmitting/receiving unit 860 or various types of data received via the interface 870 may be transmitted to a specified email address.

Sixth Embodiment

In the above-described embodiments, forward match, backward match, or partial match may be specified. In this case, for example, when the login name is "userA", if forward match is specified, "userA_home", "userA_emergency", and "userA_additional" are retrievable. In addition, for example, when the login name is "userA", if backward match is specified, "home_userA" and "emergency_userA" are retrievable. Furthermore, for example, when the login name is "userA", if partial match is specified, login names such as "home_userA_sample" and "emergency_userA_sample" are retrievable.

Seventh Embodiment

In the above-described embodiments, a my-address search may be interrupted by pressing an interrupt button or the like during the search. Accordingly, usability can be improved.

Eighth Embodiment

In the above-described embodiments, even when a my-address search returns hits, it may be chosen not to display login names that are not linked with e-mail addresses. Accordingly, usability can be improved by excluding display of unnecessary information.

Ninth Embodiment

In the above-described embodiments, regardless of which of a login name or a user name has been used as a keyword, a list of search results may be displayed to include not only the hit login names but also e-mail addresses linked with the hit login names. Accordingly, mistakes in selection can be reduced by checking the email addresses.

Tenth Embodiment

In the above-described embodiments, usage restrictions may be set in units of login names, and, if a usage-restricted login name is displayed in a search result, this login name may be set as selection-disabled. Accordingly, security can be improved by preventing accidents of transmitting data to a wrong destination to which transmission should not be performed.

Eleventh Embodiment

In the above-described embodiments, a user whose user information includes no destination information may be restricted from using the functions described in the above-described embodiments. Accordingly, security risks can be reduced.

Twelfth Embodiment

The administrator may be able to set whether or not the functions described in the above-described embodiments are usable according to each login name.

Thirteenth Embodiment

Individual entries each at least including a login name and an email address are associated with one another and are stored in an address book table. This address book table may be a regular address book table that stores usual destinations, or may be an address book for my-address search, which is provided separately from the regular address book table in accordance with an embodiment. In any case, it is preferable that an address book table be prepared for each user and be associated with a login name. If duplications among users can be avoided in operation, an address book table common to a plurality of users may be used. In addition, if a division name is used as a login name, the my-address search function can be used according to each division. Using a division name as a login name does not exclude each individual from logging in using his/her login name. Each individual can personally use the my-address search function according to the usage, or may use the my-address search function as a person who belongs to a division.

Fourteenth Embodiment

Referring next to FIG. 11, a fourteenth embodiment will be described. In this embodiment, a my-address search apparatus includes the following: a keyword setting rule holding unit 605, a keyword setting unit 607, a keyword holding unit 609, a keyword display/changing unit 611, a user list table search unit 613, a search result display/selecting unit 615, and a user list table display/editing unit 617.

The user list table 653, a login name/password input unit 601, an authentication unit 603, a data transmitting unit 619, the document reading device 820, and the operation panel unit 850 are used by the my-address search apparatus, but may be included in the my-address search apparatus.

The user list table 653 stores a set of a login name, a password, a user name, and an email address for each user. The user list table 653 also stores a set of a login name serving as a search target of a my-address search, a password, a user name, and an email address. A login name used when a user logs in serves as a keyword, and another login name including that login name functions as a label. In addition, in the sense that a login name used when a user logs in is also included in the search results, the login name also functions as a label. A my-address search can be also conducted using a user name corresponding to a login name when a user logs in as a keyword, but in that case, another user name including that user name functions as a label. In addition, in the sense that a user name corresponding to a login name used when a user logs in is also included in the search results, the user name also functions as a label.

The login name/password input unit 601 inputs a login name and a password in response to a user operation via the operation panel unit 850.

The authentication unit 603 performs authentication and determines that the user has been successfully authenticated when the set of the login name and password input by the login name/password input unit 601 matches any of sets of login names and passwords stored in the user list table 653.

The keyword setting rule holding unit 605 receives specification to use, as a keyword for a my-address search, a login name, a user name, or both of a login name and a user name from the administrator or the user via the operation panel unit 850, and holds that specification.

The keyword setting unit 607 sets a keyword(s) on the basis of the specification of a keyword(s), which is held by the keyword setting rule holding unit 605. When a login name is specified as a keyword, the keyword setting unit 607 sets the login name of a user who has logged in as a keyword. When a user name is specified as a keyword, the keyword setting unit 607 sets a user name corresponding to the login name of a user who has logged in as a keyword. When a user name and a user name are specified as keywords, the keyword setting unit 607 sets the login name of a user who has logged in and a user name corresponding to the login name as keywords. Note that a user name used as a keyword may be retrieved from the user list table 653 using the login name as a key.

The keyword holding unit 609 holds the keyword(s) set by the keyword setting unit 607 along with the attribute indicating whether the or each keyword is a login name or a user name.

The keyword display/changing unit 611 displays the keyword(s) held in the keyword holding unit 609 in an editable text box provided on the operation panel unit 850, and, on receipt of a change to the keyword(s) from the operation panel unit 850, the keyword display/changing unit 611 changes the keyword(s) held in the keyword holding unit 609 in accordance with the received change.

The user list table display/editing unit 617 displays the details of the user list table 653 via the operation panel unit 850, and receives addition of a user to, change of a user in, or deletion of a user from the user list table 653. In particular, a user who is to be searched for by a my-address search is added. In other words, a user with a login name including the login name of a user who regularly logs in is added. In addition, a user with a user name including a user name corresponding to the login name of a user who regularly logs in may be added. Furthermore, a user with a login name including a character string obtained by editing the login name of a user who regularly logs in may be added, or a user with a user name including a character string obtained by editing a user name corresponding to the login name of a user who regularly logs in may be added. The degree of editing may be determined by each user, or may be determined in advance.

The user list table search unit 613 searches the user list table 653 using the keyword(s) held in the keyword holding unit 609. In other words, when a login name is specified as a keyword, records whose login names forward-, backward-, or partially match the keyword(s) are extracted from the user list table 653, and the login names, user names, and destinations (such as email addresses) in these records are output as the search results. In addition, when a user name is specified as a keyword, records whose user names forward-, backward-, or partially match the keyword(s) are extracted from the user list table 653, and the login names, user names, and destinations in these records are output as the search results. From an unillustrated portion, the specification of forward match, backward match, or partial match is received as a search condition. In addition, when a login name is specified as a keyword in the initial setting, a login name may be used as a keyword unless otherwise specified. Alternatively, when a user name is specified as a keyword in the initial setting, a user name may be used as a keyword unless otherwise specified. Yet alternatively, when both of a login name and a user name are specified as keywords in the initial setting, a login name and a user name may be used as keywords unless otherwise specified.

A Uniform Resource Locator (URL), an IP address, and a facsimile number may be added to the user list table 653, and a URL, an IP address, or a facsimile number may be selected as a destination, besides an email address.

The search result display/selecting unit 615 displays a list of search results obtained by the user list table search unit 613 on the operation panel unit 850. The displayed list includes the retrieved login names, user names, and email addresses serving as destinations. In addition, the search result display/selecting unit 615 receives specification of a destination from among the destinations in the displayed list, and sets the specified destination as the destination.

Fifteenth Embodiment

The user list table display/editing unit 617 displays and edits the login name, password, user name, email address, URL, IP address, and so forth of each communication partner, which are stored in the user list table 653. Editing includes addition, changes, and deletion. In particular, a login name or a user name serving as a search target of the my-address search function may be displayed and edited as a communication partner.

In addition, the user list table display/editing unit 617 can use, using the authentication unit 603 and the user list table 653, the login name and user name of a currently logged-in user as the initial values of a login name and a user name that are to be registered in the user list table 653. Accordingly, the user can easily edit a login name and a user name, which serve as search targets of the my-address search function, simply by adding desired characters, numerals, or symbols or a combination thereof to the initial values.

Sixteenth Embodiment

As described above, authentication information may be a character string constituting a login name, but may not necessarily be a character string. Authentication information may be, for example, biometric information such as a finger print, a palm print, or an iris. Note that a login name represented by a character string is associated with biometric information by an authentication server or a certain function unit (such as an authentication unit) of the MFP 800. Therefore, when a user logs in using biometric information, a login name or a user name corresponding to the biometric information, or a character string obtained by editing the login name or the user name is used as a keyword to implement the above-described embodiments.

Seventeenth Embodiment

Index information may be automatically generated in association with authentication information. For example, in the case of registering another transmission destination corresponding to a user whose login name is "userA", as its preparation, records that have "userA1", "userA2", and so forth as login names may be automatically added to the user list table. Later, the user may add a user name and an email address serving as a destination to each of these records. In addition, for example, in the case of registering another transmission destination corresponding to a user whose user name is "Suzuki", as its preparation, records that have "SuzukiA1", "SuzukiA2", and so forth as user names may be automatically added to the user list table. Later, the user may add a login name and an email address serving as a destination to each of these records.

Note that the above-described information transmitting apparatus can be realized by hardware, software, or a combination thereof. In addition, an information transmitting method performed by the above-described information transmitting apparatus can be realized by hardware, software, or a combination thereof. Here, being realized by software means being realized by a computer reading and executing a program.

The program can be stored using various types of non-transitory computer readable media and can be supplied to the computer. Non-transitory computer readable media include various types of tangible storage media. Examples of non-transitory computer readable media include magnetic recording media (such as flexible disks, magnetic tapes, and hard disk drives), magneto-optical recording media (such as magneto-optical disks), compact-disc read-only memory (CD-ROM), compact-disc recordable (CD-R), compact-disc rewritable (CD-R/W), and semiconductor memory (such as mask ROM, programmable ROM (PPROM), erasable ROM (EPROM), flash ROM, and random-access memory (RAM)). Alternatively, the program may be supplied to the computer using various types of transitory computer readable media. Examples of transitory computer readable media include electric signals, optical signals, and electromagnetic waves. Transitory computer readable media can supply the program to the computer via a wired communication path such as an electric wire and an optical fiber or a wireless communication path.

The present disclosure can be implemented in various other forms without departing from the spirit or major features of the present disclosure. Therefore, the above-described embodiments are merely for illustrative purposes only and are not construed to be interpreted restrictively. The scope of the present disclosure shall be determined by the appended claims and are not restricted by the text of the description. Furthermore, variations and modifications falling within the equivalent scope of the claims are all within the scope of the present disclosure.

The present disclosure can be used for selecting the destination of information.

The present disclosure contains subject matter related to that disclosed in Japanese Priority Patent Application JP 2017-162941 filed in the Japan Patent Office on Aug. 28, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image data apparatus comprising:
   a table of a plurality of records each of which includes a name related to authentication information and a transmission destination, the name being any one of a login name used to log into an information transmitting apparatus and a user name which corresponds to the login name, the login name in each and every one of the plurality of records being unique among the login names in the table, and one said user name existing for each said login name;
   a search unit that searches the table for at least one record that is linked with the authentication information used to log in to the image data apparatus by comparing the name in each of the plurality of records with a keyword that is based on the name related to the authentication information used to log in to the image data apparatus;
   a display that displays a list including each of the at least one record that is linked with the authentication information; and
   a transmitter that transmits image data to at least one transmission destination obtained from each of the at least one record selected from the list.

2. The image data apparatus according to claim 1, wherein the keyword is based on the login name corresponding to the authentication information used to log in to the apparatus, the user name associated with the authentication information used to log in to the apparatus, or both of the login name and the user name.

3. The image data apparatus according to claim 2, wherein the login name corresponding to the authentication information used to log in to the apparatus and the user name associated with the authentication information used to log in to the apparatus are editable, and, when the login name or the user name is edited, the login name or the user name after editing is used as the keyword instead of the login name or the user name before editing.

4. The image data apparatus according to claim 1, wherein the search unit compares the name in each of the plurality of records with the keyword based on forward match, backward match, or partial match between the name in each of the plurality of records and the keyword.

5. The image data apparatus according to claim 1, wherein the login name or the user name includes a character string corresponding to the authentication information.

6. The image data apparatus according to claim 1, further comprising:
   a setting unit that sets at least one transmission destination obtained from each of the at least one record selected from the list as a transmission destination of image data.

7. The image data apparatus according to claim 6, further comprising:
   a selecting unit that selects each of the at least one record from the list.

8. The image data apparatus according to claim 6, further comprising:
   a transmission destination adding unit that adds another transmission destination to the at least one transmission destination set by the setting unit.

9. A multifunctional peripheral comprising:
   the image data apparatus according to claim 1.

10. An image data method for an image data apparatus, the image data method comprising:
   providing a table of a plurality of records each of which including a name related to authentication information and a transmission destination, the name being any one of a login name used to log into an information transmitting apparatus and a user name which corresponds to the login name, and the login name in each and every one of the plurality of records being unique among the login names in the table, and one said user name existing for each said login name;
   searching the table for least one record that is linked with authentication information used to log in to the image data apparatus by comparing the name in each of the plurality of records with a keyword that is based on the name related to the authentication information used to log in to the image data apparatus;
   displaying a list including each of the at least one record that is linked with the authentication information; and
   transmitting image data to at least one transmission destination obtained from each of the at least one record selected from the list.

11. A non-transitory recording medium storing a program for causing a computer to function as the image data apparatus according to claim 1.

12. The image data apparatus according to claim 1, wherein:
   the name related to the authentication information is either one or both of the login name and the user name.

13. The image data apparatus according to claim 1, further comprising:
   a unit which generates a new record including a new name and a new transmission destination, the new name including a common portion with a name in an existing record of the table such that the new record is linked with the authentication information with which the existing record is linked, and the new name also includes a character string indicating a category of a transmission destination included in the new record.

14. The image data apparatus according to claim 3, wherein:
- the display displays a re-search button; and
- in response to a user selecting the re-search button, the search unit searches the table for each of the at least one record that is linked with the edited login name or the edited user name.

15. The image data apparatus according to claim 1, wherein the authentication information includes biometric information.

16. The image data apparatus according to claim 1, wherein the search unit searches the table for at least one of the user name and an email addressed that is linked with the authentication information used to log in to the image data apparatus.

17. The image data apparatus according to claim 1, wherein the authentication is a character string.

18. The image data apparatus according to claim 1, wherein the authentication is biometric information.

\* \* \* \* \*